April 25, 1961 R. J. SCHNEEBERGER ET AL 2,981,863

STORAGE DISPLAY SYSTEM

Filed Feb. 12, 1958

WITNESSES

Edwin E. Basler

Leon J. Lazo

INVENTORS
Robert J. Schneeberger
& John G. Castle, Jr.
BY
Charles F. Renz
ATTORNEY 2,981,863
Patented Apr. 25, 1961

2,981,863

STORAGE DISPLAY SYSTEM

Robert J. Schneeberger, Pittsburgh, and John G. Castle, Jr., Sardis, Pa., assignors to Westinghouse Electric Corporation, East Pittsburgh, Pa., a corporation of Pennsylvania Filed Feb. 12, 1958, Ser. No. 714,786

5 Claims. (Cl. 315—12)

This invention relates to display systems and more particularly to those systems in which information may be introduced and then extracted at a later time.

This invention is more particularly directed to a viewing type of storage tube in which the information extracted is displayed visually on the face of the storage tube.

Storage type cathode ray display tubes have been proposed and utilized for display in systems such as television and radar in order to obtain brighter images and to display different types of information simultaneously on the same viewing screen.

In general, the viewing type storage tube consists of a foraminated storage grid member which controls the electron flow between a flooding type electron gun and a luminescent screen. A space distributed charge image is produced on the surface of the storage grid by an intensity modulated scanning or writing electron beam and the charge image recorded on the grid controls or modulates the flow of electrons from the flooding type reading gun to the screen and thus a visual light image of the charge pattern is produced on the display screen.

The charge pattern on the storage grid may be created by secondary electron emission from the surface of the storage grid. In most devices, the writing beam is only able to change the charge on the surface of the storage grid in only one direction. It is therefore normally necessary to erase or remove this information by changing the voltage between the cathode of the flooding gun and the storage grid before new information may be displayed on the same area.

There are many applications where it would be desirable to write a charge image on the storage grid so as to provide storage information which may be read out by the reading gun for a predetermined interval and at the same time superimpose a line or moving object of non-storage information directly on to the viewing screen without disturbing the storage information on the storage grid. The system herein described would allow one to place storage information on the storage grid which would be read out for a period of time, for example, of the order of one tenth of a second or longer to display storage information on the screen. Simultaneously non-storage information such as a moving object or symbol could be superimposed on the display on the screen. This non-storage information would have the decay time of the phosphor on the display screen. This might be on the order of one thousandth of a second. The writing of the non-storage information on the screen would have little or no effect on the charge image on the storage grid.

It is, accordingly, an object of our invention to provide an improved display system in which stored information may be displayed on a screen while simultaneously superimposing independent non-storage information on the screen.

It is another object to provide a cathode ray tube in which stored and non-stored information can be displayed simultaneously on a common viewing screen.

It is another object to provide a cathode ray display tube in which interaction between stored and non-stored information is at a minimum.

It is another object to provide an improved display system which includes a storage tube in which information may be stored within said storage tube and displayed for a predetermined time and simultaneously superimposing non-storage information on the display screen.

These and other objects are affected by my invention as will be apparent from the following description taken in accordance with the accompanying drawing throughout which like reference numerals indicate like parts and in which.

Figure 1:
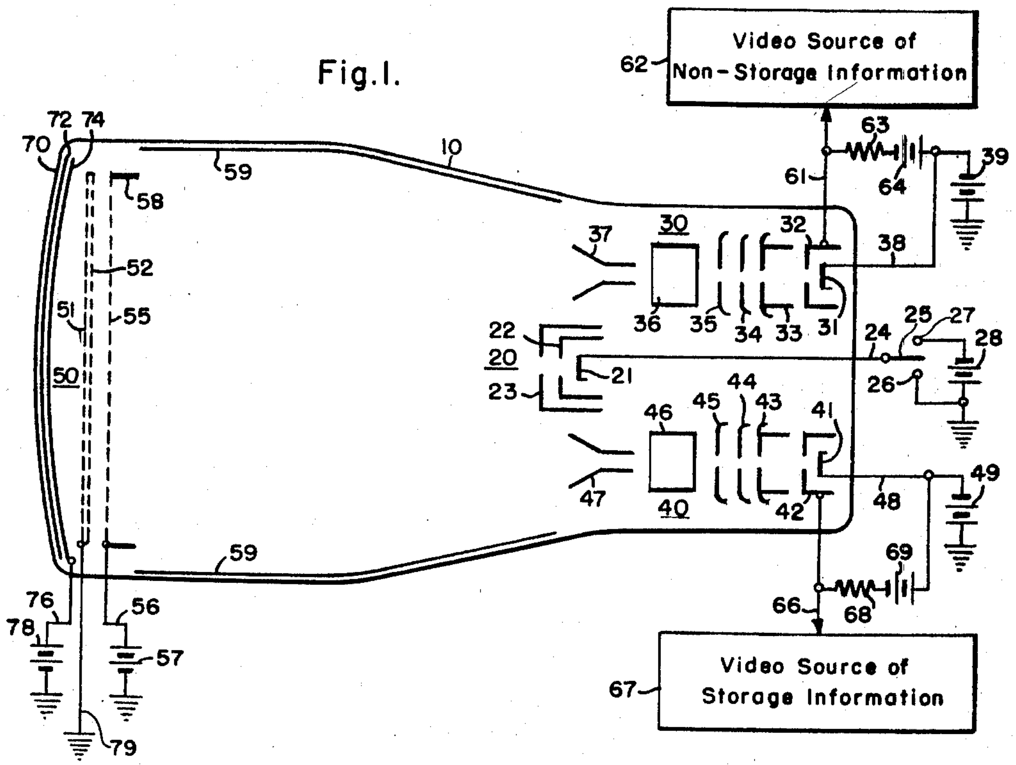
Figure 1 is a schematic view of a storage tube embodying our invention.

Referring in detail to Fig. 1, there is shown a storage tube comprising an evacuated envelope 10 of suitable shape and configuration and of a suitable material. Positioned at one end of the envelope 10 are a plurality of electron guns 20, 30 and 40. In the specific embodiment shown two electron guns 30 and 40 are provided for generating a pencil type electron beam which may be used to scan the entire surface of a storage grid 50 positioned at the opposite end of the envelope 10. The third gun 20 centrally located within the envelope 10 is provided for generating a flooding electron beam so as to flood the entire surface of the storage grid 50. The two pencil type electron beam generating guns 30 and 40 are essentially identical in structure and only one will be described for purposes of this invention.

The upper electron gun 30 as shown in Fig. 1, which may be referred to as the write-through gun is comprised of a cathode 31, a control grid 32 and beam forming and accelerating electrodes 33, 34 and 35. Electrostatic deflection means in the form of two pairs of plates 36 and 37 are provided in front of the beam forming electrodes for deflecting the electron beam generated within the electron gun 30 so as to scan a raster on the storage grid 50. Suitable voltages are applied to the electrodes 31, 32, 33, 34 and 35 in a well known manner in order to provide proper focusing and control of the electron beam. The cathode 31 of the write-through gun 30 is connected by means of a lead-in conductor 38 to the negative terminal of a voltage source illustrated as a battery 39. The potential of the battery 39 may be of the order of 8 kilovolts and the positive terminal is connected to ground. The control grid 32 is connected by means of a lead-in conductor 61 to a video information source 62 of a non-storage type information. The grid 32 is also connected through a resistor 63 to the negative terminal of a battery 64. The potential of the battery 64 may be of the order of 60 volts with the positive terminal of the battery 64 connected to cathode 31.

The other pencil beam type electron gun 40 may be referred to as the storage write gun and as previously indicated is similar in structure to the write-through gun 30. The cathode 41 is connected by means of a lead-in conductor 48 to the negative terminal of a suitable voltage source illustrated as a battery 49. The positive terminal of the battery 49 is connected to ground and the battery 49 may have a potential of the order of 400 volts. The control grid 42 of the storage write gun 40 is connected by a lead-in conductor 66 to a video source 67 of storage information. The lead-in conductor 66 of the control grid 42 is also connected through a resistor 68 to the negative terminal of a battery 69. The positive terminal of the battery 69 is connected to the negative terminal of the battery 49. The battery 69 supplies the necessary biasing voltage to the control grid 42 of the storage write gun 40. The electron gun 40 also has beam forming and focusing electrodes 43, 44 and 45 and also deflection plate systems 46 and 47.

The flood gun 20 is centrally located within the envelope 10 and consists of at least a cathode 21, a control grid 22 and an anode 23. The flood gun 20 produces a high current divergent beam so as to flood the storage grid 50 with electrons substantially uniformly across the entire surface. The cathode 21 of the flood gun 20 is provided with a lead-in conductor 24 to the exterior of the envelope 10 and is connected to a switch 25. The switch 25 has two terminals 26 and 27. The terminal 26 is connected to ground while the other terminal 27 is connected to the negative terminal of a suitable voltage source illustrated as a battery 28 of a potential of the order of 10 volts. The positive terminal of the battery 28 is connected to ground.

Positioned on the opposite end of the envelope 10 with respect to the electron guns is an end plate or viewing window 70 of a transparent material such as glass which also closes off the end of the envelope 10. Deposited on the inner surface of the transparent end plate 70 is a coating 72 of a suitable luminescent material. The coating 72 emits radiations normally in the visible region when bombarded by electrons. A suitable material for the coating 72 would be phosphor material such as zinc sulfide activated with copper which emits radiations in the visible region. An electron permeable coating 74 of electrical conductive material such as aluminum may be deposited on the exposed surface of the phosphor layer 72. A lead-in conductor 76 is provided from the conductive coating 74 to the exterior of the envelope 10 to provide means of applying a suitable potential to the phosphor screen 72. The lead-in conductor 76 is connected to the positive terminal of a battery 78 with the negative terminal of the battery 78 connected to ground. The potential of the battery 78 should be of the order of 10 to 15 kilovolts in order to provide the necessary acceleration to the electrons so as to cause sufficient emission of light from the phosphor screen 74.

Figure 2:
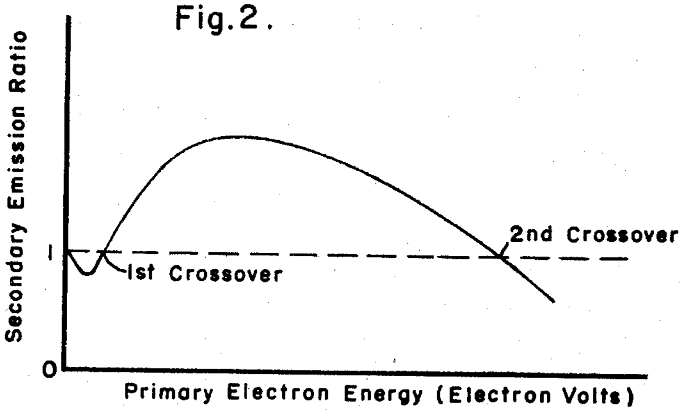
Fig. 2 is a characteristic curve of effective secondary emission ratio of a typical storage target versus the energy of the bombarding electrons with respect to the surface of the material.

Positioned adjacent and parallel to the phosphor screen 74 is the foraminated storage grid member 50 which consists of a conductive back plate 51 which may be in the form of a fine wire mesh screen having 200 or more openings per linear inch. On the surface of the conductive back plate 51 remote from the phosphor screen is deposited a coating 52 of a dielectric material which has a very high specific resistivity such as silica or magnesium fluoride. The coating 52 should also have secondary emissive properties such as illustrated in Fig. 2. The foraminated back plate 51 may be manufactured by any suitable method to obtain an apertured member and may be of a material such as nickel or copper. The storage grid may also have the form of a self-supporting dielectric mesh of suitable resistivity and a secondary emission characteristic, coated with a conductive back plate. The dielectric should have a resistivity of at least $10^{13}$ ohm cm. The storage grid 50 is provided with a lead-in conductor 79 to the exterior of the envelope 10 and may be connected to ground as shown in the specific embodiment.

Positioned adjacent to and parallel to the storage grid 50 is a collector grid 55 which is normally in the form of a fine mesh having a comparable number of openings as the storage grid 50. A lead-in conductor 56 is also provided to the collector grid 55 and is connected to the positive terminal of a suitable voltage source illustrated as a battery 57. The negative terminal of the battery 57 is connected to ground and the battery 57 may be about 300 volts.

The collector grid 55 which is of similar area as the storage grid 50 is provided with an annular metallic member 58 on the side thereof facing the electron guns and has a similar positive potential of about 300 volts above ground as the collector grid 55. The member 58 and the wall coating 59 serve to collimate the electrons from the flood gun 20 so that the electrons approach the storage grid 50 normal to the plane thereof. The conductive coating 59 on the inner surface of the envelope 10 between the collector grid 50 and the electron guns is maintained at a potential difference of the order of negative 20 to 50 volts.

To explain the operation of the described tube, it is necessary to refer to Fig. 2. If it is assumed that the write-through gun 30 and the storage write gun 40 are biased to cut off and the cathode 21 of the flooding electron gun 20 is connected to the terminal 27 which is about 10 volts negative with respect to ground then electrons will be emitted from the flooding gun 20 and be accelerated to the storage grid 50. The electrons will approach the storage grid with an energy of about 10 electron volts and strike the storage grid 50. Since 10 electron volts is below the first crossover point on Fig. 2, the bombarded surface of the storage insulator layer 52 of the storage grid 50 will charge in a negative direction to an equilibrium potential of about 10 volts negative with respect to ground. When the switch 25 on the flooding gun cathode 21 is then connected to the other terminal 26 which is at ground, no electrons from the flooding gun 20 can be transmitted through the storage grid 50. This assumes that a negative 10 volts applied on the storage surface of the storage grid is cut off for the planar triode.

If it is now assumed that the storage video information is applied to the storage write gun 40, the electrons within the electron beam will be modulated in their current density and will strike the surface of the storage insulator 52 of the storage grid 50 with an energy of about 400 electron volts which is between the first and second crossovers of the target as illustrated in the curve shown in Fig. 2. In this area of the curve, the number of secondary electrons collected from the insulator surface of the storage grid 50 is greater than the number of primary electrons bombarding the surface and therefore the surface will charge in a positive direction. The secondary electrons emitted by the insulator surface of the storage grid 50 are removed from the vicinity by the electric fields of the collector grid 55 and the phosphor electrode 74. By the application of suitable voltages to the deflection plates 46 and 47 associated with the storage write gun 40, a positive charge pattern is written on the insulator surface of the storage grid 50 corresponding to the storage information received from the video source 67. This type of write operation within a storage tube is normally referred to as non-equilibrium writing.

Since the cut off potential of the storage grid 50 with respect to the flooding electron gun 20 is 10 volts negative with respect to ground and the writing gun 40 has driven the insulator surface of the storage grid 50 more positive than the cut off potential, then electrons from the flooding gun 20 will pass through the storage grid 50 and be accelerated by the high potential applied to the phosphor screen 72 causing the electrons to bombard the phosphor screen 72 resulting in emission of light from the phosphor screen 72. The electric field in the openings of the storage grid 50 established by the potential applied to the phosphor screen 72 and by the metal conductive back plate 51 of the storage grid 50 guide the flood electrons through the opening to the phosphor screen 74. Since the approach energy of the electrons from the flooding gun 20 is relatively small, no electrons will strike the insulator surface of the storage grid 50. The luminescent pattern appearing on the phosphor screen 72 is a replica of the charge pattern written and stored on the insulator surface of the storage grid 50 by the storage write gun 40. This pattern will continue to appear or to be read out as long as the charge pattern remains on the storage grid 50. Frame erasure, either partial or complete, may be accomplished by pulsing either the cathode of the flooding gun 20 or the storage grid 50.

The desired superposition of non-storage or rapidly changing information directly on the phosphor viewing screen 72 may be accomplished by use of the write-through gun 30. To superimpose a non-storage write-through pattern or image on the storage write pattern or image on the screen 72, requires sufficient contrast for the write-through operation to be visible on the stored image which may be in some cases bright. Practical use of the write-through pictures requires resolution at least as good as that of the stored image. Both of these requirements must be made without seriously affecting the read-out of the stored information. This non-interference requires little or no erasure of the charge pattern on the storage grid.

This may be accomplished by applying video information from the non-storage video information source 62 to the grid 32 of the write-through gun 30, thereby modulating the current density of the electron beam generated by the write-through gun 30. The cathode 31 of the write-through gun 30 is at a negative potential of several kilovolts with respect to ground and therefore with respect to the storage grid 50. A portion of the electrons in the beam from the write-through gun 30 will strike the storage insulator surface of the storage grid 50 with an energy of several thousand electron volts. This energy as seen in Fig. 2 is at or near the second crossover of the material and therefore the secondary emission ratio is about unity. That is, the same number of electrons will be emitted from the insulator surface of the storage grid 50 as the number of primary electrons bombarding the surface from the write-through gun 30. The net change in charge on the insulator surface of the storage grid 50 is therefore substantially zero and the existing charge pattern on the surface is not disturbed. The remaining portion of the electrons from the write-through gun 30 will go through the openings in the storage grid 50, be given further energy and strike the phosphor screen 70 to display non-storage information superimposed on the flood display of the stored information. It should be noted that the electrons from the write-through gun 30 have an energy of say 8000 electron volts and are not affected to any extent by the 2 to 10 volts modulation on the storage grid 50. If the write-through gun 30 is placed reasonably close to the axis of the tube, the range of incident angles is quite small so that the effect on the stored image due to variations in the angle of incidence is quite small over the screen 72. It is also obvious that additional write-through guns can be added in cluster fashion around the axis of the tube for superimposing more than two independent information functions.

It should be noted that the write-through electron beam being of several thousand electron volts energy for the second crossover write-through mode herein, is readily focussed to resolutions equivalent or better than that displayed in the stored pattern. Further, the extra energy (several thousand electron volts above the flooding electrons) gives adequate contrast of the write-through display above even a bright area in the display of stored information. By operating in the region of second crossover, it is found that the resolution of the non-storage display is equal or better than the stored visual image. The contrast of the non-storage display is above even the bright areas of the stored visual image and the interference with the stored image on the storage grid is negligible. This also permits rapid changes to non-storage information to be displayed. The response being limited in part by the required contrast and the decay of the phosphor on the display screen.

While we have shown our invention in only one form, it will be obvious to those skilled in the art that it is not so limited, but is susceptible to various other changes and modifications without departing from the spirit and scope thereof.

We claim as our invention:

1. In a storage system comprising a cathode ray tube, an electrostatic storage member having a plurality of apertures positioned within said tube, means for directing upon a surface of said storage member a first pencil type electron beam of such velocity that the number of secondary electrons liberated from said storage member is greater than the number of primary electrons arriving, scanning means to deflect said first beam over said surface of said storage member, means to modulate said first beam in accordance with information to be stored on said storage member to produce at elemental areas on said storage member electrostatic charge conditions representative of said information, means for directing upon said storage member a flooding electron beam of such velocity so as to pass through the apertures in said storage grid and bombard an electron sensitive target and be modulated in accordance with the charge pattern on said storage grid, means for directing a second pencil type electron beam upon said storage member of such a velocity that the secondary electrons emitted from the surface of said storage member is substantially equal to the number of primary electrons striking said surface while permitting the electrons directed at said apertures of said storage grid to pass through and bombard the target and means for modulating said second beam with non-storage information to superimpose said non-storage information on said storage information on said target.

2. The method of displaying two types of information simultaneously within a storage type display tube, comprising the steps of writing storage type information on a storage grid with an electron beam of an energy between the first and second crossover potential of the storage grid to store a given image thereon, flooding said storage grid with an electron beam of an energy below said first crossover potential to modulate said flooding electron beam in accordance with the charge pattern on said storage grid and display a visual image corresponding to said charge image and directing an electron beam modulated with non-storage type information at said storage grid, said electron beam having an energy substantially equal to said second crossover potential to simultaneously display non-storage information with said storage information on said display screen.

3. A storage display system comprising an electrostatic storage member having a plurality of apertures therein, a display screen positioned on one side of said storage member and a plurality of electron beam generating means positioned on the opposite side of said storage member, said electron beam generating means comprising a first pencil-type electron beam for scanning said storage member with electrons of such a velocity that the number of secondary electrons emitted from said storage member is of a different number than the primary electrons arriving to produce a charge image on said storage member, scanning means to deflect said first pencil-type electron beam over the surface of said storage member, means to modulate the number of electrons in said first beam in accordance with information to be displayed for a given length of time, a flooding electron beam directed at said storage member with electrons of such a velocity to be modulated by the charge on said storage member to provide a modulated electron image which bombards the display screen producing a visual image corresponding to said charge image, and a second pencil-type electron beam directed toward said storage member of such a velocity that the secondary electrons emitted from the surface of said storage member is substantially equal to the number of primary electrons striking said surface while permitting the electrons directed at said apertures to pass through and bombard the display screen and means for modulating the number of electrons within said second beam with non-storage information to superimpose the non-storage visual information on the stored visual image for a time less than the stored information image.

4. A storage display system comprising a foraminated electrostatic charge storage grid including a dielectric storage material, a display screen disposed adjacent said storage grid, means for forming a first electron beam of electrons of a first energy and directing said first electron beam toward said storage grid to write a charge pattern thereon in response to storage video information modulation applied to said first electron beam, means for forming a second electron beam to flood said storage grid with electrons of a second energy to pass through the apertures in said storage grid in accordance with modulation provided by said charge pattern thereby bombarding said display screen and producing light emission therefrom corresponding to said charge pattern, and means for generating and controlling a third electron beam and directing it toward said storage grid such that electrons of said third electron beam strike said storage grid substantially at the second crossover potential of said dielectric storage material and pass through said storage grid and bombard said display screen without modulating the charge pattern on said storage grid.

5. In a storage system comprising a cathode ray tube, an electrostatic storage member having a plurality of apertures positioned within said tube, means for directing upon a surface of said storage member a first pencil type electron beam of such velocity that the number of secondary electrons liberated from said storage member is greater than the number of primary electrons of said first beam incident thereto, scanning means to deflect said first beam over said surface of said storage member, means to modulate said first beam in accordance with information to be stored on said storage member to produce at elemental areas on said storage member electrostatic charge conditions representative of said stored information, means for directing upon said storage member a flooding electron beam of such velocity so as to pass through the apertures in said storage grid and bombard an electron sensitive target and be modulated in accordance with the charge pattern on said storage grid, means for directing a second pencil type electron beam upon said storage member with a velocity such that the electrons of said second pencil type electron beam impinge upon said storage member substantially at the second crossover potential of said storage member and pass through the apertures of said storage member and bombard said electron sensitive target, and means for modulating said second pencil type electron beam with non-storage information to superimpose said non-storage information on said stored information on said target.

References Cited in the file of this patent

UNITED STATES PATENTS

| | | |
|---|---|---|
| 1,955,899 | Zworykin | Apr. 24, 1934 |
| 2,884,558 | Smith | Apr. 28, 1959 |

OTHER REFERENCES

Knoll: "Characteristics of a Transmission Control Viewing Storage Tube with Halftone Display," Proc. of the I.R.E., October 1954, page 1496.